(12) United States Patent
Sudano

(10) Patent No.: US 8,197,733 B2
(45) Date of Patent: Jun. 12, 2012

(54) WOOD GRAIN EXTRUSIONS

(75) Inventor: Angelo Sudano, Boisbriand (CA)

(73) Assignee: Plastibec Inc., Boisbriand, Quebec (CA)

( * ) Notice: Subject to any disclaimer, the term of this patent is extended or adjusted under 35 U.S.C. 154(b) by 89 days.

(21) Appl. No.: 11/832,424

(22) Filed: Aug. 1, 2007

(65) Prior Publication Data

US 2009/0035581 A1 Feb. 5, 2009

(51) Int. Cl.
*B29C 63/00* (2006.01)
(52) U.S. Cl. .......................... 264/171.1; 264/73; 264/75
(58) Field of Classification Search ............ 264/73, 264/75, 171.1
See application file for complete search history.

(56) References Cited

U.S. PATENT DOCUMENTS

| 5,387,381 | A | 2/1995 | Saloom |
| 5,996,672 | A | 12/1999 | Kotin |
| 6,083,601 | A | 7/2000 | Prince et al. |
| 6,583,189 | B1 * | 6/2003 | King ................................ 521/79 |
| 2004/0038002 | A1 * | 2/2004 | Franco et al. ................ 428/151 |
| 2004/0232581 | A1 * | 11/2004 | Hills ................................ 264/75 |
| 2007/0092701 | A1 | 4/2007 | Jeng |
| 2007/0154689 | A1 | 7/2007 | Hughes et al. |

FOREIGN PATENT DOCUMENTS

| CA | 2399354 | 4/2004 |
| CA | 2502341 | 9/2006 |

* cited by examiner

*Primary Examiner* — Yogendra Gupta
*Assistant Examiner* — John Robitaille
(74) *Attorney, Agent, or Firm* — Choate Hall & Stewart LLP; Charles E. Lyon

(57) ABSTRACT

The invention is the provision of an elongated imitation wood product or component which has a plastic core and a plastic coating on at least one surface with the coating, which is of two different colours and which has a randomly swirled pattern, giving a realistic appearance of the wood grain of natural wood to the product. The invention further is in the method and equipment for producing such a realistic imitation wood product or component made of plastic.

18 Claims, 6 Drawing Sheets

WOOD GRAIN EXTRUSIONS

FIELD OF THE INVENTION

This invention relates to the provision of plastic extrusions which realistically simulate wood products to the process for producing such extrusions, and the equipment used in such process.

BACKGROUND OF THE INVENTION

It has always been an aim to produce an extruded plastic product which simulates wood with wood's warm aesthetic appearance but does not have the limitations of wood insofar as weathering, splitting, cracking, warping etc. To this end efforts have been made to print or laminate the surfaces of a plastic extrusion with patterns representing wood grains in an effort to give the plastic extrusion the appearance of wood. None of these methods has really been successful. These methods are currently in operation however require additional equipment(s) in order to print or laminate on to the surface combined with specialized equipment if the printing or laminating is done on an uneven surface. This secondary operation is often, depending on the profile, an operation which is done off-line, hence further increasing costs.

In other cases, materials have been mixed with the plastic material which is to be extruded in an effort to create the appearance of wood. U.S. Pat. No. 6,083,601, for example, is directed to providing a simulated wood product involving a complex processing system in which powdered cellulose, preferably sawdust, is mixed with a thermoplastic resin such as acrylonitrile butadiene styrene (ABS) or styrene acrylonitrile (SAN). The mixture is then compressed, heated and pelletized under carefully controlled conditions. These pellets are then used as a filler along with the thermoplastic resin in extruding a foamed core. This core is then covered by a clear coextruded protective cladding.

The requirement of having to use sawdust or the like as well as the complexity of the process renders the production of this simulated product costly and with the clear plastic covering the appearance and feel of the product lacks realism.

In another approach, Canadian Patent 2,399,354 discloses an extruded wood imitation component comprising an extruded body or core containing a mix of different colored thermoplastic polymer material which coloured material is said to produce veins of irregular lengths and shapes throughout the core and outer surfaces of the core to simulate natural wood. To improve the appearance of the component, it is said that wood particles may be mixed with the polymer material with the wood products making up from 3% to 40% of the core material. The process, according to this patent, is said to require careful control not only over the raw material but the equipment design and also the process conditions to produce the imitation wood product.

It is the object of this invention to provide a process for producing plastic extrusions which are made to have the appearance of a different selected one of a variety of different woods and which so simulate the variety of wood selected that it is essentially indistinguishable from that wood. It is a further object to provide such wood simulated plastic extrusions which are produced at a relatively low cost with a unique process utilizing unique equipment.

SUMMARY OF THE INVENTION

The invention resides in providing an extruded length of plastic material which imitates natural wood by coextruding a coating containing at least two different colours on at least one surface of a core such that the coating is given a coloured swirl effect which gives the coating a wood grain appearance which looks just like that of natural wood.

Further, in accordance with the invention, such coating may be roughened or embossed to give the feel of wood.

According to the invention, the core of the extruded plastic member or component can be solid plastic or foamed plastic and, in accordance with the preferred form of the invention, the plastic for both the core and the coextruded coating are polyvinyl chloride (PVC).

The invention further resides in the process whereby the coating is given the coloured swirled wood grain appearance of natural wood and the equipment used in such process The invention further resides in providing the equipment for producing the swirl in the coextruding material as it is deposited on the extruded core material and to the wood simulated extrusions so produced.

DETAILED DESCRIPTION ACCORDING TO THE PREFERRED EMBODIMENTS OF THE PRESENT INVENTION

Figure 1:
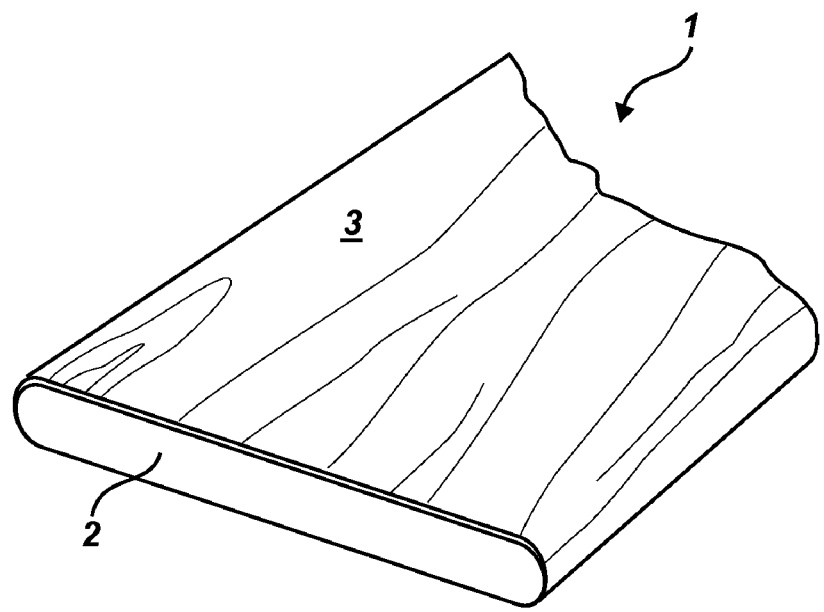
FIG. 1 is a broken away perspective view illustrating an extrusion having a coextruded wood grain appearing plastic coating on one surface of a plastic core in accordance with one aspect of the invention.
Figure 2:
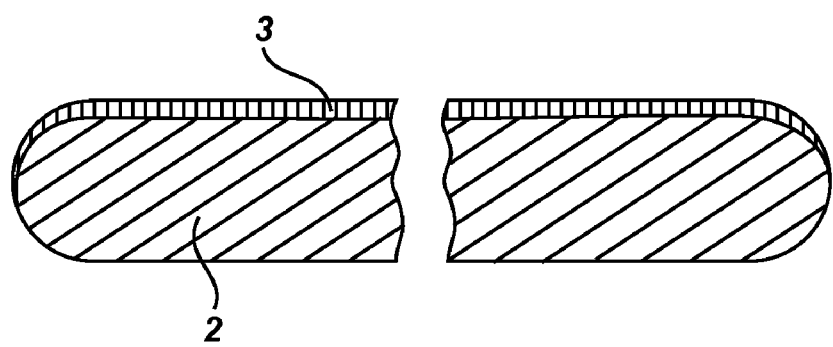
FIG. 2 is a broken away cross sectional view of the extrusion of FIG. 1.

Referring first to FIGS. 1 and 2, there is shown an extrusion generally designated at 1 comprising a plastic core 2 having a coextruded coating 3 on the upper side thereof that realistically imitates the appearance of wood grain.

Preferably the core 2 is a polyvinyl chloride (PVC) which may be either rigid or foamed PVC and the coating 3 is preferably a rigid PVC plastic although it will be understood other plastic materials such as acrylonitrile butadiene styrene (ABS) or styrene acrylonitrile (SAN) may be used.

Figure 3:
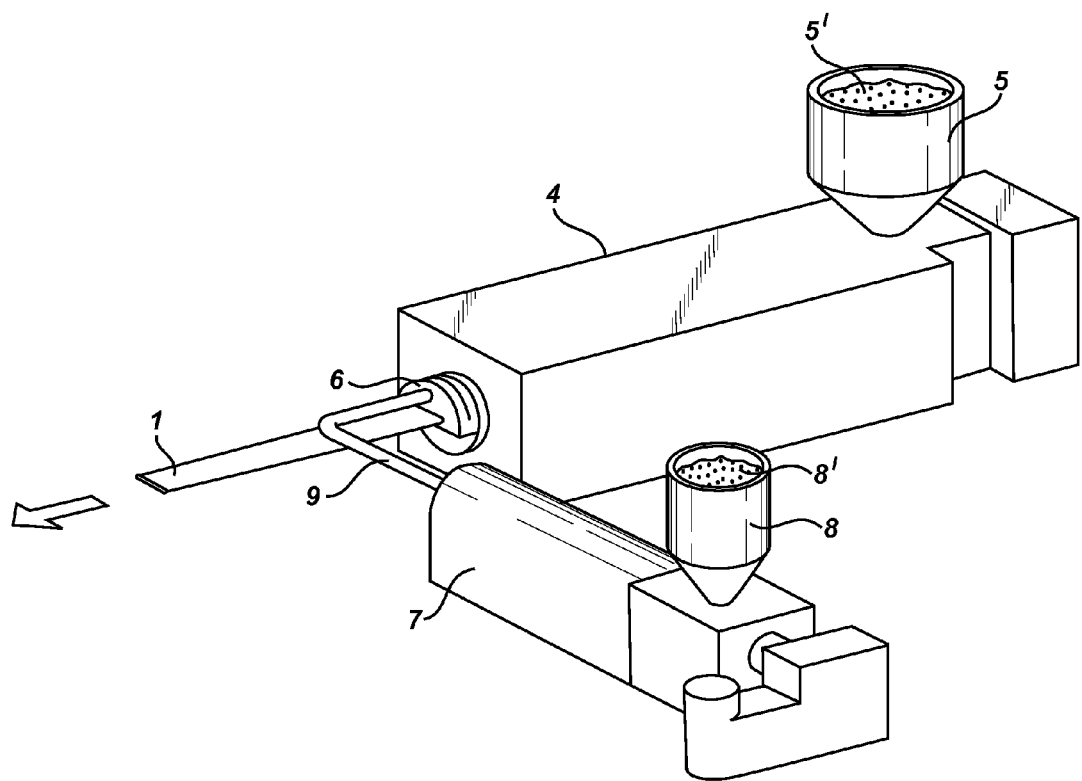
FIG. 3 is a perspective view illustrating the set up of a main extruder for producing the core and the coextruder for extruding the coating material for coating the core to produce the extrusion illustrated in FIGS. 1 and 2.

FIG. 3 is a perspective diagram illustrating the extruder set up for producing the extrusion 1 of FIGS. 1 and 2. This equipment comprises the main extruder 4 having a feed hopper 5 delivering a stream of core material 2 through a multipart die generally designated at 6 bolted to the main extruder 4.

Also feeding die 6 is the output from a coextruder 7 having a feed hopper 8 and output delivery piping 9 feeding into die 6.

The main extruder 4 operates conventionally with its hopper 5 being charged with the requisite plastic material 5', preferably PVC, with foaming agents etc. added if the core is to be foamed PVC as will be well understood by those skilled in the art.

The coextruder 7 differs materially from a conventional coextruder and its charge which again is preferably a PVC material 8' includes at least two different coloured PVC pellets selected to provide the desired colouration of the coating 3 to match the wood which is wished to be imitated.

Figure 4:
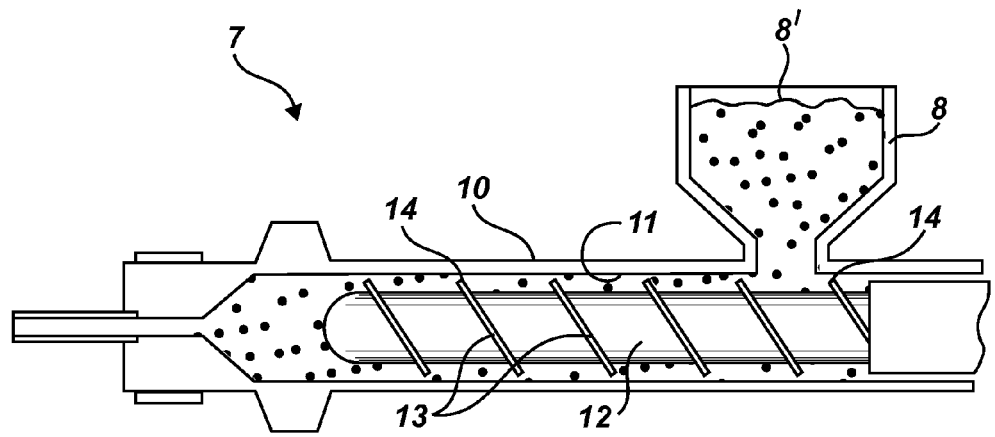
FIG. 4 is a diagrammatic view of the coextruder with half of its barrel removed showing the relationship between the feed screw and the interior of the barrel in which the tops or crests of the screw thread flights are spaced from the interior wall of the barrel.
Figure 5:
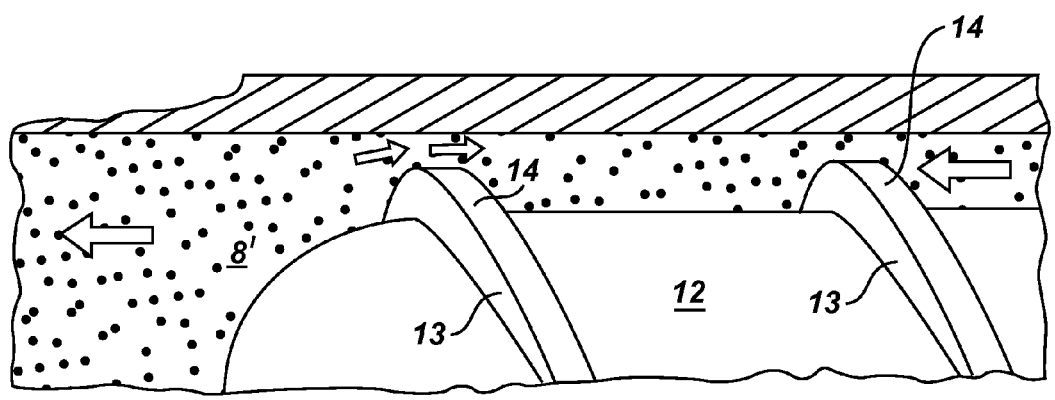
FIG. 5 is an enlarged fragmented perspective view showing the flow clearance between the tops or crests of the screw flights and the interior wall of the barrel of the coextruder.

With reference to FIGS. 4 and 5, it will be seen that the coextruder 7 fed by the hopper 8 includes a barrel 10 having an interior surface 11 which houses a feed screw 12 having a flight of threads 13 whose tops or crests 14 are spaced from the interior surface 11 of the barrel so that as the feed screw 12 is rotated to advance the plastic material in the barrel, the delivery pressure of the plastic is reduced below that of a conventional extruder, that is, the feed of the screw is less positive so that if the feed of the plastic before being deposited on the core is restricted anywhere the plastic 8' can surge back over the screw crests 14 and behind the threads as illustrated in FIG. 5.

When PVC material is used in the coextruder, the barrel is operated at temperatures from about 260° F. to about 330° F. with coloured pellets with different melting temperatures randomly melting along the barrel with larger pellets taking longer to melt than smaller ones so that, while the general colour of the output of the coextruder is as selected, it will have random variations in its hue.

Figure 6:
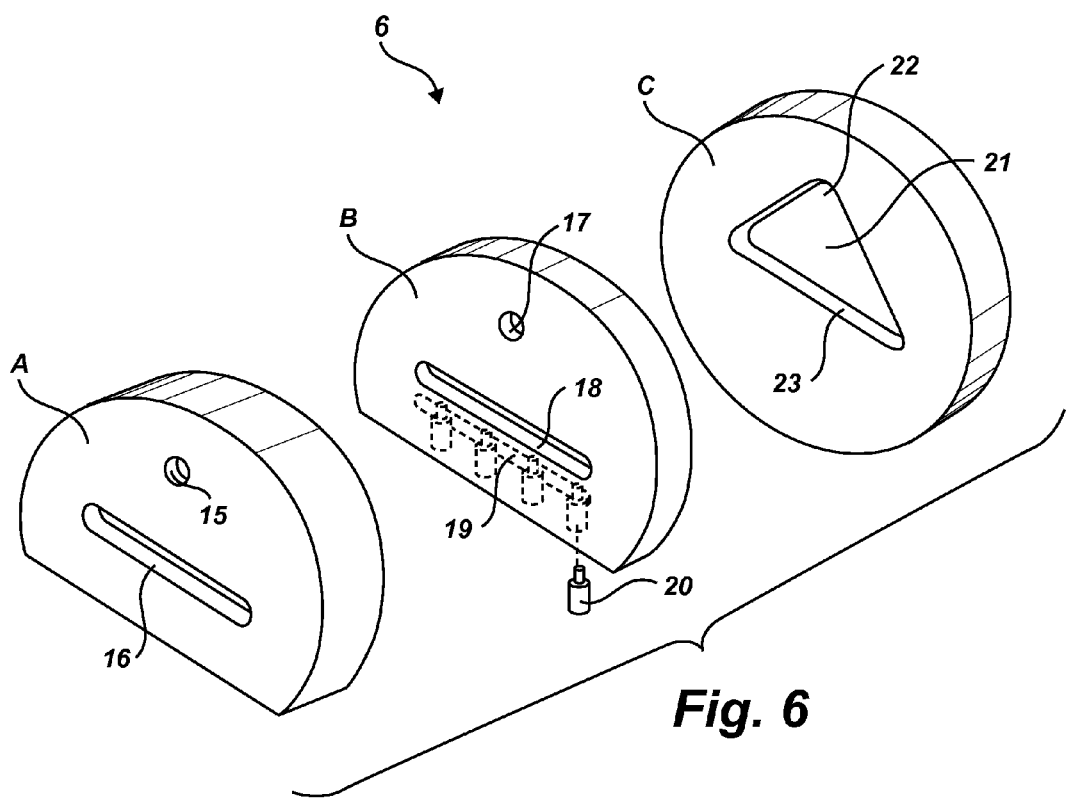
FIG. 6 is an exploded perspective view showing the component die plates A, B and C (with the bolt and other internal openings omitted) which go together to make up the extrusion die used in producing the extrusions of FIGS. 1 and 2.
Figure 7:
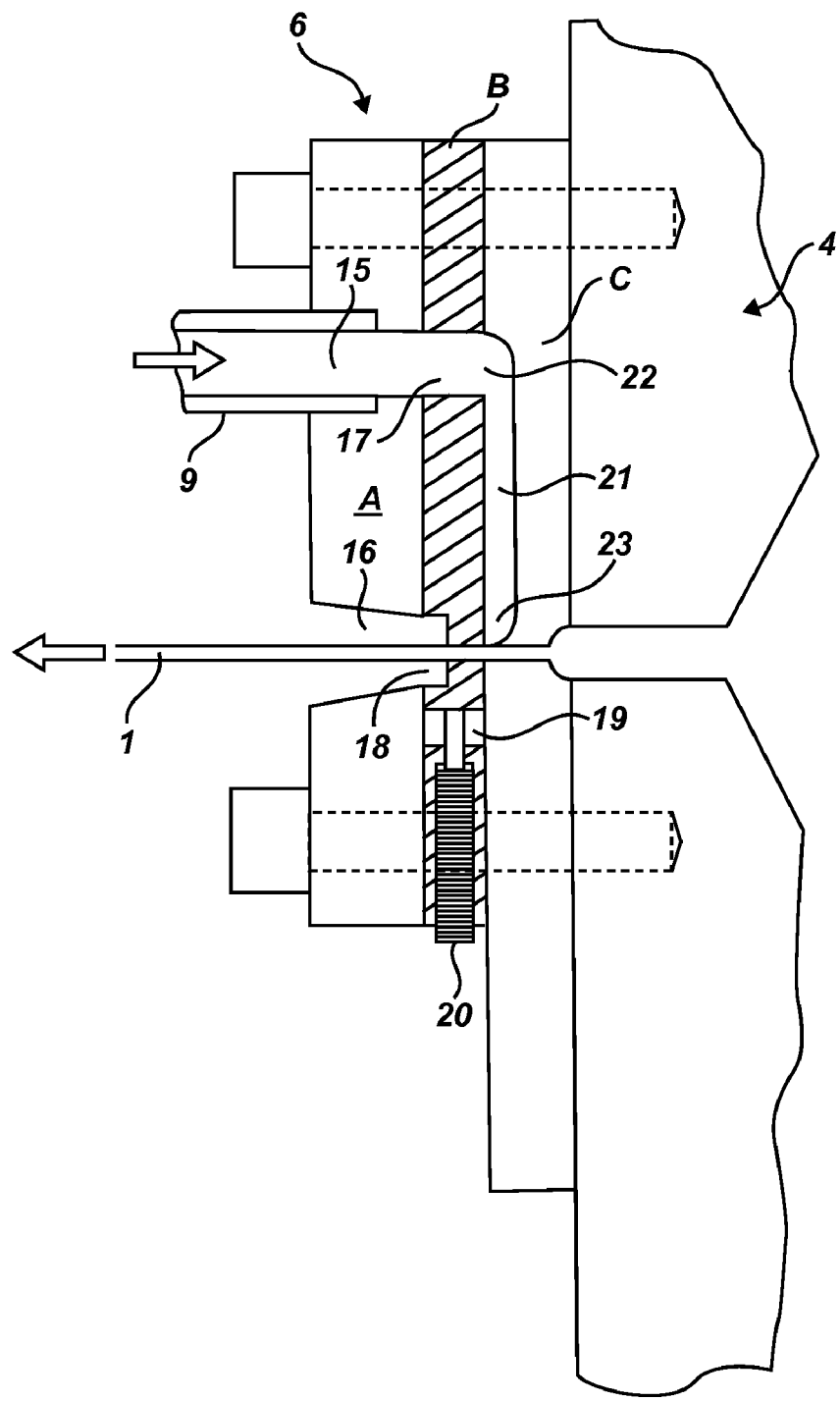
FIG. 7 is a part elevational part sectional view of the extrusion die of FIG. 6 showing the flow of the core material delivered by the main extruder and the flow of the coating material delivered by the coextruder.

The output from the coextruder 7 is delivered by the feed tubing 9 to the die generally designated at 6 shown in FIGS. 6 and 7. This die 6 is made up of three plates, Plate A, Plate B and Plate C. Plate A has an inlet passage 15 to receive and allow flow through of the feed from the coextruder and an outlet passage 16 from which the coextruded member 1 exits.

Plate B has a coextrusion plastic flow through passage 17 for registering with the passage 15 of Plate A and an outlet passage 18 for registering with the outlet passage 16 of Plate A through which the coextruded product or component 1 exits.

Plate B also has a space 19 underneath outlet passage 18 into which screws 20 are threaded to press against the underside of outlet passage 18 to enable very fine adjustments of the thickness of the coextruded product 1 as it emerges from outlet passage 18.

Plate C has a recessed generally triangular formation 21 into the upper corner 22 of which feed from the coextruder flowing through Plate A and Plate B passages 15 and 17 is fed. This material is free to spread out in the triangular formation 21 as it flows down to a restricted outlet 23 which feeds on to the upper surface of the core material 2 being delivered from the main extruder 4.

This combination of allowing the coextruded plastic from the coextruder to first spread out and then have to pass through the restricted outlet 23 causes small flow surges and retractions which can occur as a result of the materials being able to surge back into the coextruder over the crests 14 of the feed screw threads and behind these threads until sufficient material concentration occurs to cause a small reverse surge of material. The net result is that the coloured plastic from the coextruder is deposited on the core plastic 2 in the form of slight eddy currents or swirls giving the coextruded coating a randomly swirled pattern with randomly changing colour hues.

It has been found that by coextruding the coating in this manner there is given a wood grain appearance to the coated surface of the extrusion 1 that so imitates the wood grain of natural wood that the surface appearance of the extrusion 1 is almost indistinguishable from natural wood.

If desired, the extrusion can be roughened or embossed by running it through an embossing wheel to give the feeling of natural wood as well.

Figure 8:
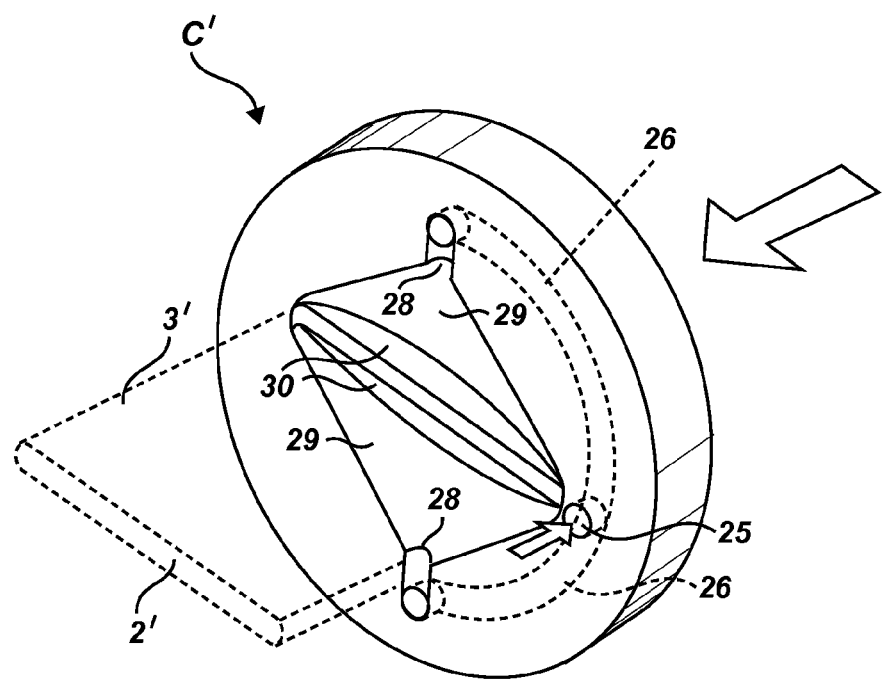
FIG. 8 is a front elevational view of a die plate (with the bolt and other internal openings omitted) which forms die plate C' in a die in contrast to die plate C in FIG. 6 in order to produce an extruded core having a wood grain appearing coating on both sides and encasing the core.
Figure 9:
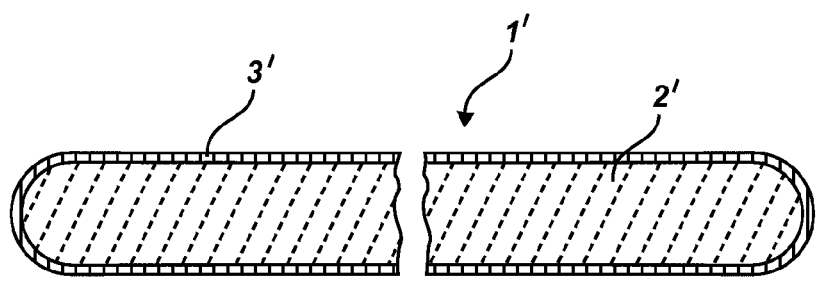
FIG. 9 is a broken away cross sectional view of the extrusion produced using the die plate C' shown in FIG. 8.

There are a great many applications where it is desirable to provide the wood grain appearance only on one side of the extrusion. For instance, in condominiums it is often a requirement that all shutters, blinds or valences etc. only show white to the outside of the building so that the uniformity and clean look of the condominium will be maintained and there will not be a hodge podge of different colours appearing to the outside. However, the occupant of each condominium may elect to have a desired inner surface that looks like a selected natural wood.

Where it is desired to have both sides of a core 2' of an extrusion 1' coated with a coating 3' as illustrated in FIG. 9, all that needs to be done is to provide a coextrusion die corresponding to die 6 with a "sandwich" die plate C' as shown in FIG. 8 (with the bolt and other internal openings omitted). In this case, die plate C' has an inlet passage 25 to receive the coating material 8' being extruded. Passage 25 feeds arcuate feed splitting distribution channels 26 which deliver the coating material 8' through direction changing channels 27 into the apexes 28 of triangular recessed formations 29 corresponding to the recessed formation 21 of plate C. After the material being coextruded spreads through the triangular recesses 29, it is delivered through restricted discharge openings 30 which feed on to opposite sides of and around the core material 2' to impart the desired wood grain appearing surface coating to the core material 2' in the same manner as that described above to very realistically imitate material wood.

As mentioned, while PVC is the preferred material other plastics may be used such as ABS and SAN. For these other plastics, the operating temperature of the barrel of the coextruder will be varied according to their melt characteristics.

While the preferred embodiment of the invention has been described, it will be understood that variations may be made without departing from the scope of the appended claims.

The embodiments of the invention in which an exclusive property or privilege is claimed are defined as follows:

1. A process for producing a length of plastic material imitating natural wood, said process comprising extruding a core of plastic material and coextruding a coating of plastic material containing at least two different colour pellets having different melting temperatures, on at least one surface of said core, the coextruding step comprising:
   providing the plastic material containing the at least two different colour pellets to an extruder comprising a barrel and a feed screw,
   advancing the plastic material containing the at least two different colour pellets through the barrel with the feed screw so as to allow flow surges back over parts of the feed screw, and passing the plastic material containing the at least two different colour pellets through an extrusion die passage having a spreading portion and a restricted outlet, causing said coating material to produce a randomly swirled coloured pattern as it is deposited on said at least one surface of said core to give said at least one surface an appearance of wood grain of natural wood.

2. A process as claimed in claim 1, in which the colours in said coextruded coating are selected to imitate the wood grain appearance of a desired selected natural wood.

3. A process as claimed in claim 1, in which said coating plastic material is coextruded to encase said core.

4. A process as claimed in claim 1, in which said core material is PVC.

5. A process as claimed in claim 1, in which said coating is PVC.

6. An extrusion process for producing a length of plastic material simulating natural wood, said process comprising coextruding a coloured plastic material containing at least two different colour pellets having different melting temperatures on to at least one surface of an extruded core material wherein the coextruding step comprises:

providing the coloured plastic material to an extruder comprising a barrel and a feed screw advancing the coloured plastic material through the barrel with the feed screw so as to allow flow surges back over parts of the feed screw, and passing the coloured plastic material comprising the at least two different colour pellets through an extrusion die passage having a spreading portion and a restricted outlet, creating eddy current producing surges of said coloured plastic material as it is deposited on said at least one surface of said core to produce a coating on said core material which said coating has a randomly swirled pattern of coloured material having an appearance of natural wood grain.

7. A process as claimed in claim 1 in which said parts of the feed screw are crests of feed screw threads.

8. A process as claimed in claim 7 in which the barrel has an inner surface and said crests are sufficiently spaced away from the inner surface of the barrel to allow the flow surges of said plastic material back over the crests of the feed screw.

9. A process as claimed in claim 8 in which the feed screw is rotated to advance the plastic material in the barrel at a delivery pressure reduced below that of a conventional extruder.

10. A process as claimed in claim 1 further comprising the step of roughing or embossing the coating material deposited on the core sufficient to give a feeling of natural wood.

11. A process as claimed in claim 1 wherein the at least two different colour pellets comprise larger pellets and smaller pellets such that the larger pellets take longer to melt than the smaller pellets along the barrel.

12. A process as claimed in claim 6 in which said parts of the feed screw are crests of feed screw threads.

13. A process as claimed in claim 12 in which the barrel has an inner surface and said crests are sufficiently spaced away from the inner surface of the barrel to allow the flow surges of said plastic material back over the crests of the feed screw.

14. A process as claimed in claim 13 in which the feed screw is rotated to advance the plastic material in the barrel at a delivery pressure reduced below that of a conventional extruder.

15. A process as claimed in claim 6 further comprising the step of roughing or embossing the coating material deposited on the core sufficient to give a feeling of natural wood.

16. A process as claimed in claim 6 in which the at least two different colour pellets comprise larger pellets and smaller pellets such that the larger pellets take longer to melt than the smaller pellets along the barrel.

17. A process as claimed in claim 1 in which said core material is foamed.

18. A process as claimed in claim 6 in which said core material is foamed.

\* \* \* \* \*